United States Patent [19]
Rickabus

[11] Patent Number: 5,931,525
[45] Date of Patent: Aug. 3, 1999

[54] AUTOMOTIVE INTERIOR PULL HANDLE ASSEMBLY

[75] Inventor: Ted Rickabus, Ortonville, Mich.

[73] Assignee: Lear Corporation, Southfield, Mich.

[21] Appl. No.: 08/868,592

[22] Filed: Jun. 4, 1997

[51] Int. Cl.[6] .............................. B60R 13/02; B60N 3/02
[52] U.S. Cl. .............................. 296/214; 16/125; 24/297; 411/353; 411/533
[58] Field of Search .......................... 296/214; 16/110 R, 16/125; 24/289, 297; 411/352, 353, 531, 533

[56] References Cited

U.S. PATENT DOCUMENTS 5,519,917  5/1996  Cordonnier .......................... 296/214 X Primary Examiner—Andrew C. Pike
Attorney, Agent, or Firm—Brooks & Kushman

[57] ABSTRACT

A vehicle headliner pull handle assembly is attachable to a vehicle interior sheet metal component which is covered by a head impact foam having openings formed therein. The assembly includes a pull handle body portion forming a grip and having first and second ends, wherein each end forms a peripheral edge. An extended attachment portion protrudes from each end and extends through one of the openings in the head impact foam for attachment to the sheet metal component. A headliner has the attachment portions extending there-through. A stabilizer plug is positioned over each attachment portion against the sheet metal component for providing strength to the assembly and for trapping the headliner against the peripheral edge of the respective end of the pull handle body.

14 Claims, 3 Drawing Sheets

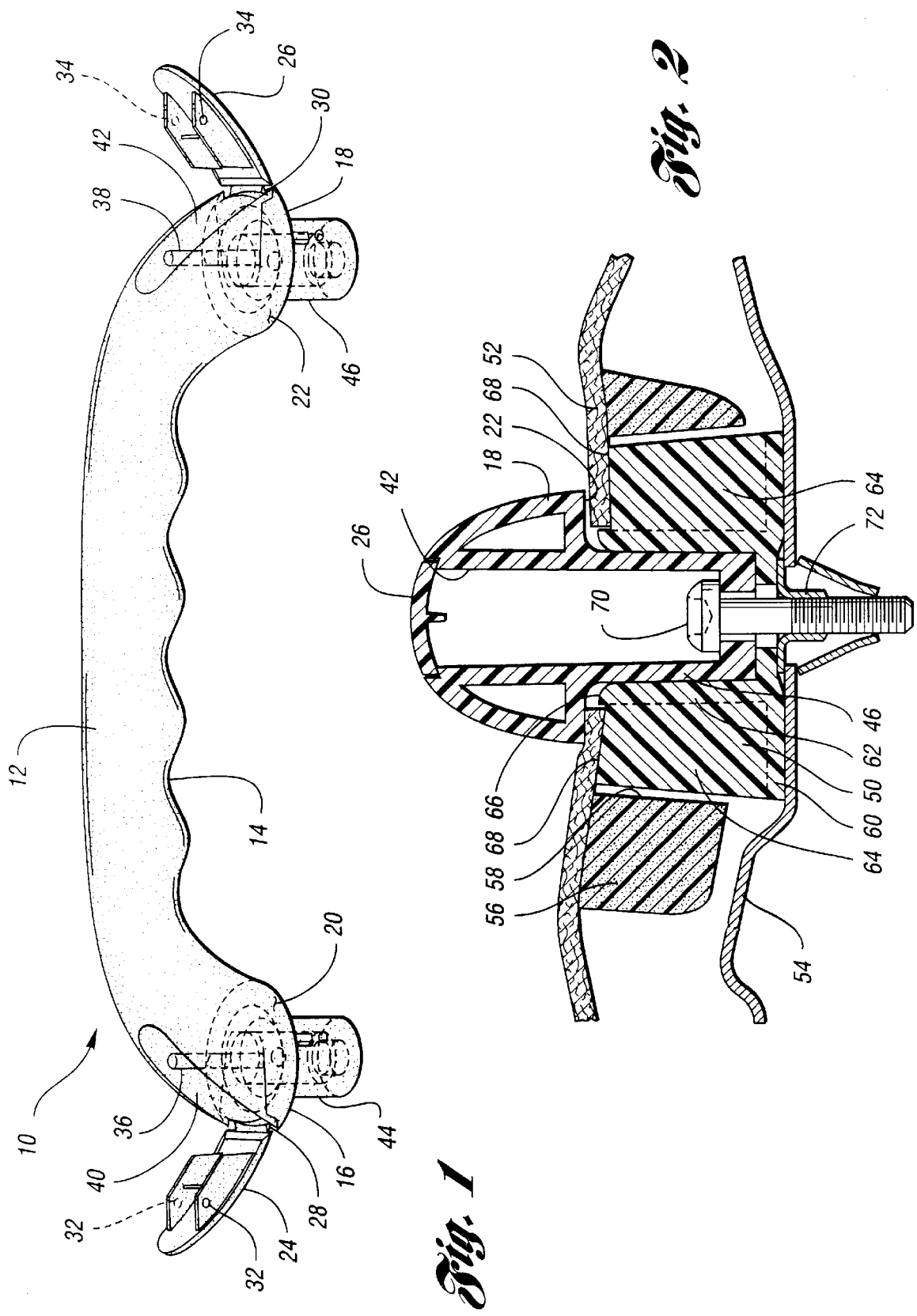

AUTOMOTIVE INTERIOR PULL HANDLE ASSEMBLY

TECHNICAL FIELD

The present invention relates to an automotive interior pull handle assembly for attachment in a vehicle which includes a head impact foam disposed beneath a headliner.

BACKGROUND OF THE INVENTION

Recent changes to the Federal Motor Vehicle Safety Standards require a layer of head impact foam to be positioned beneath headliners in certain vehicles. This new requirement creates a design and assembly problem for automotive interior pull handles which are normally positioned on vehicle headliners.

Such pull handles must support substantial loads, and must also pinch against the headliner so that the opening in the headliner is not exposed. In order to accomplish this, the pull handle must be designed with a thin protruding portion which protrudes through the headliner, and further through the head impact foam for attachment to the sheet metal. In this manner, the headliner may be pinched by the end of the pull handle body portion in order to cover up the opening formed in the headliner. However, the protruding portion must be designed as a substantially thick member in order to support the required loads. In order to accomplish this thick protruding portion, the entire pull handle must be made substantially larger, which is not desirable for manufacturing, handling, or aesthetic purposes.

Accordingly, it is desirable to provide a plastic pull handle assembly with a main body portion having generally the same size and appearance of typical pull handles, while providing the capability of extending through a head impact foam layer while pinching against the headliner to obscure the opening in the headliner, while providing substantial mechanical strength.

It is further desirable that the pull handle assembly be assembled integrally with the headliner so that the pull handle assembly and headliner may be shipped as a single assembly unit, and installed simultaneously in the vehicle as a single unit.

SUMMARY OF THE INVENTION

The present invention overcomes the abovereferenced pull handle design problems associated with the new Federal Motor Vehicle Safety Standard head impact foam requirements by providing a pull handle assembly which includes a body portion with extended attachment portions protruding from its opposing ends, and a stabilizer plug which snaps onto each attachment portion for adding substantial strength to the pull handle and for pinching the headliner between the plug and the body portion.

More specifically, the present invention provides an automotive interior pull handle assembly for attachment to a vehicle sheet metal component which is covered by a head impact foam and a headliner. The pull handle assembly includes a body portion forming a grip and having first and second ends. Extended attachment portions protrude from the first and second ends for extending through the head impact foam for attachment to the sheet metal component. Stabilizer plugs are positioned over each attachment portion. Each plug includes a base plate for positioning against the sheet metal component, a hollow cylindrical portion extending from the base plate for engagement with the respective attachment portion, and a plurality of stabilizer ribs extending between the base plate and the cylindrical portion for providing strength to the pull handle assembly.

In a preferred embodiment, the stabilizer ribs extend from the base plate to a plane spaced from the distal end of the cylindrical portion for forming an engagement surface at the plane to facilitate trapping of the headliner between the engagement surface and the respective end of the body portion.

Another aspect of the invention provides a vehicle headliner pull handle assembly for attachment to a vehicle interior sheet metal component which is covered by a head impact foam having openings formed therein. The assembly includes a pull handle body portion forming a grip and having first and second ends, wherein each end forms a peripheral edge. An extended attachment portion protrudes from each end and extends through one of the openings in the head impact foam for attachment to the sheet metal component. A headliner is arranged such that the attachment portions extend through openings in the headliner. A stabilizer plug is positioned over each attachment portion for providing strength to the assembly and for trapping the headliner against the peripheral edge of the respective end of the pull handle body. The headliner pull handle assembly is designed such that the stabilizer plugs pinch the headliner against the pull handle body portion so that the headliner pull handle assembly may be handled as an independent unit, and installed into the vehicle by inserting the stabilizer plugs into the openings formed in the head impact foam, and positioned against the sheet metal for attachment thereto.

Accordingly, an object of the present invention is to provide a vehicle pull handle which is adapted for attachment in a vehicle which includes a layer of head impact foam disposed beneath the vehicle headliner.

A further object of the present invention is to provide a pull handle assembly adapted for engagement with the vehicle headliner such that the pull handle assembly and headliner may be handled and assembled as a single unit.

Another object of the present invention is to provide a pull handle assembly for use with a vehicle having a head impact foam layer beneath the headliner, wherein the pull handle assembly is sufficiently strong to support required loads, and which has an exposed body portion which is substantially the same size and shape of typical automotive interior pull handles.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a perspective view of a pull handle in accordance with the present invention;

FIG. 2 shows a cut-away sectional view of a headliner pull handle assembly secured to a sheet metal component covered by a head impact foam in accordance with the present invention;

DETAILED DESCRIPTION OF THE PREFERRED EMBODIMENT

Figure 3:
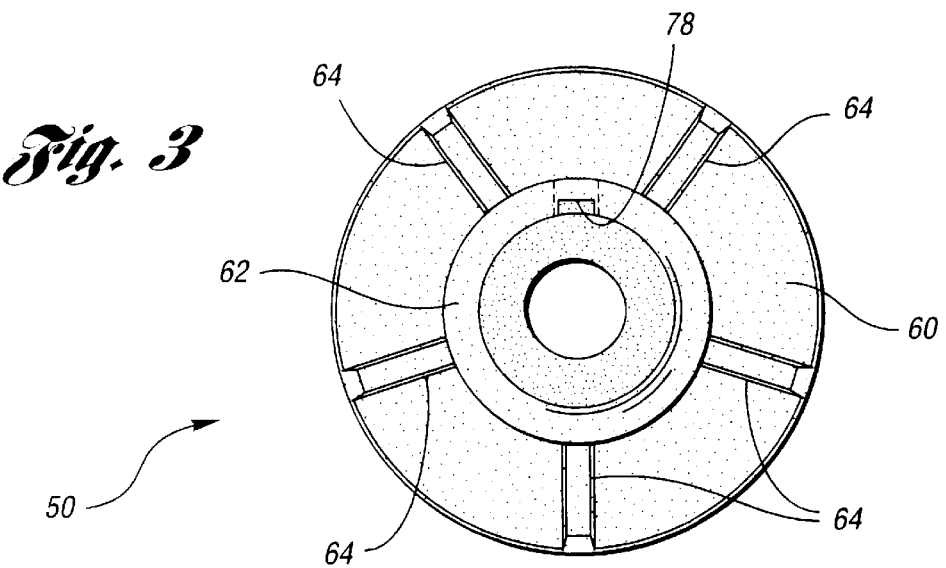
FIG. 3 shows a plan view of a stabilizer plug in accordance with the present invention.

Referring to FIG. 1, a perspective view of an automotive interior pull handle 10 is shown in accordance with the present invention. The pull handle 10 includes a body portion 12 forming a grip portion 14, and having first and second ends 16,18. The first and second ends 16,18 form peripheral edges 20,22, respectively.

Each end 16,18 further includes a snap-fitting cover 24,26 connected to the respective end 16,18 by a living hinge 28,30. Each snap-fitting cover 24,26 includes a pair of nubbins 32,34 adapted for engagement with the respective ribs 36,38 for snapping the respective cover 24,26 in position over the respective housing 40,42. The snap-fitting covers 24,26 are arranged for movably covering the respective housings 40,42 to allow access to the housings for inserting attachment screws through the attachment portions 44,46, which extend from the respective ends 16,18 of the body portion 12 for protruding through the head impact foam on a vehicle interior sheet metal component.

As shown in FIGS. 2–6, a stabilizer plug 50 is configured to snap over each attachment portion 44,46 for providing strength to the pull handle assembly and for pinching the headliner 52 between the peripheral edge 22 of the respective end 18 of the body portion 12 and the plug 50.

As shown in FIGS. 2–6, the automotive interior sheet metal 54 is covered with a head impact foam 56 having a plurality of openings 58 formed therein. Each plug 50 is configured to fit within the respective opening 58. Each plug 50 includes a base plate 60 for positioning against the sheet metal component 54. A hollow cylindrical portion 62 extends from the base plate 60 for engagement with the respective attachment portion 46. A plurality of stabilizer ribs 64 extend between the base plate 60 and the cylindrical portion 62 for providing strength to the pull handle assembly.

Figure 4:
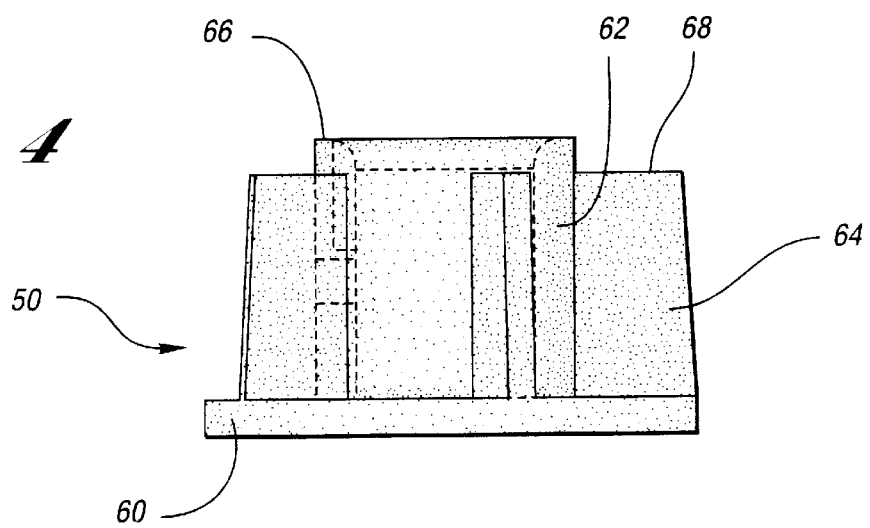
FIG. 4 shows a side view of the stabilizer plug shown in FIG. 3.
Figure 6:
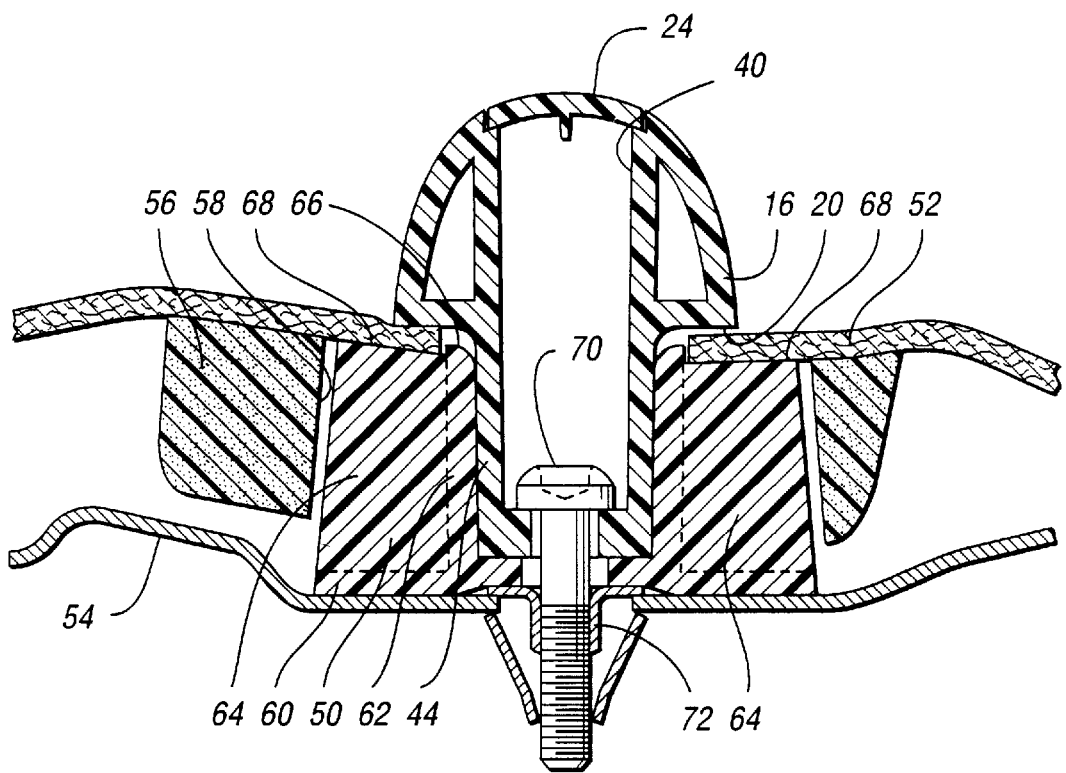
FIG. 6 shows a cut-away sectional view of a headliner pull handle assembly secured to a sheet metal component covered by a head impact foam in accordance with the present invention, the section being taken at an end of the pull handle opposite that of FIG. 2.

As shown in FIGS. 2, 4 and 6, the stabilizer ribs 64 extend from the base plate 60 to a position spaced from the distal end 66 of the cylindrical portion 62 to form an engagement surface 68 at that position to facilitate trapping the headliner 52 between the engagement surface 68 and the peripheral edge 22 of the respective end 18 of the pull handle body portion 12. Accordingly, in this configuration, the stabilizer plugs 50 may be used to pinch the headliner 52 against the respective peripheral edge 20,22 of the body portion 12 of the pull handle such that the headliner 52 and pull handle assembly may be assembled, handled, and installed into the vehicle as a single unit.

When the headliner 52 and pull handle assembly have been positioned over the sheet metal 54 and over the head impact foam 56, the snap-fitting cover 24,26 may be unsnapped to allow access to the housings 40,42 to facilitate insertion of screws 70 for installation through the push nut 72 for attachment to the sheet metal 54.

Figure 5:
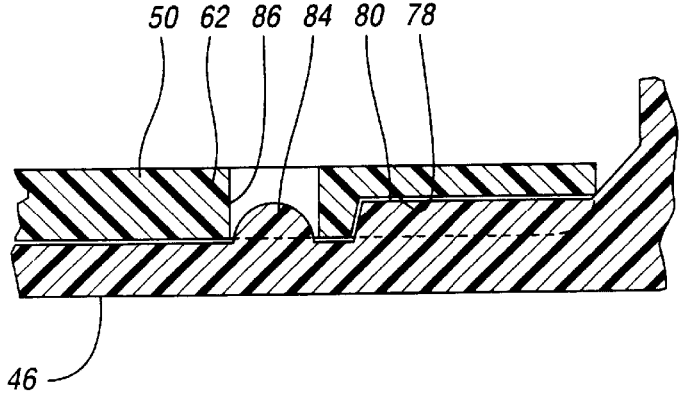
FIG. 5 shows a cut-away sectional view of a pull handle attachment portion and stabilizer plug illustrating the key and snap features in accordance with the present.

Referring to FIGS. 3 and 5, the attachment portions 44,46 and stabilizer plugs 50 include key means for properly orienting the stabilizer ribs for optimum strength, as well as snap means for securing the plug to the respective attachment portion.

FIG. 3 is a plan view of a stabilizer plug 50, and FIG. 5 is a cut-away sectional view of an engagement area between a hollow cylindrical portion 62 of a stabilizer plug 50 and an attachment portion 46 of a pull handle. As shown, the key means comprises a groove 78 formed in the hollow cylindrical portion 62, and a protrusion 80 which extends from the outer surface of the attachment portion 46 for cooperation within the groove 78 for properly orienting the stabilizer ribs 64 when the pull handle is installed in the vehicle to optimize the positioning of the ribs for maximum added strength. The snap means comprises a small bump 84 which protrudes from the outer surface of the attachment portion 46 for cooperation within an aperture 86 formed through the hollow cylindrical portion 62 of the stabilizer plug 50. Accordingly, the groove 78 and protrusion 80 may be utilized for properly orienting the stabilizer ribs, and the bump 84 and aperture 86 may be used as a snap means for snapping the plug 50 onto the respective attachment portion 46 to facilitate pinching of the headliner 52 between the plug 50 and the respective end 18 of the body portion 12 of the pull handle.

While the best mode for carrying out the invention has been described in detail, those familiar with the art to which this invention relates will recognize various alternative designs and embodiments for practicing the invention within the scope of the appended claims.

What is claimed is:

1. An automotive interior pull handle assembly for attachment to a vehicle sheet metal component which is covered by head impact foam and a headliner, the pull handle assembly comprising:

a body portion forming a grip and having first and second ends;

extended attachment portions protruding from said first and second ends for extending through the head impact foam for attachment to the sheet metal component; and stabilizer plugs over each respective attachment portion, each plug including a base plate for positioning against the sheet metal component, a hollow cylindrical portion extending from the base plate for engagement with the respective attachment portion, and a plurality of stabilizer ribs extending between the base plate and the cylindrical portion for providing strength to the pull handle assembly.

2. The pull handle assembly of claim 1, wherein said stabilizer ribs of each plug extend from the base plate of each plug to a position spaced from a distal end of the cylindrical portion of each plug and form an engagement surface at said position to facilitate trapping the headliner between the engagement surface and the respective one of the first and second ends of the body portion.

3. The pull handle assembly of claim 1, wherein said attachment portions and said stabilizer plugs include key means for properly orienting the stabilizer ribs for optimum strength.

4. The pull handle assembly of claim 3, wherein said attachment portions and said stabilizer plugs further comprise snap means for securing each plug to the respective attachment portion.

5. The pull handle assembly of claim 1, wherein said first and second ends each comprises a snapfitting cover connected to the respective first and second ends by a living hinge to facilitate access for screw attachment to the sheet metal component.

6. The pull handle assembly of claim 1, wherein each said extended attachment portion is hollow for receiving an attachment screw.

7. A vehicle headliner pull handle assembly for attachment to a vehicle interior sheet metal component which is covered by a head impact foam having openings formed therein, the assembly comprising:

a pull handle body portion forming a grip and having first and second ends, each end forming a peripheral edge;

an extended attachment portion protruding from each respective end and extending through one of the openings in the head impact foam for attachment to the sheet metal component;

a headliner having the attachment portions extending therethrough; and a stabilizer plug positioned over each attachment portion against the sheet metal component for providing strength to the assembly and for trapping the headliner against the peripheral edge of the respective end of the pull handle body portion.

8. The headliner pull handle assembly of claim 7, wherein each said stabilizer plug includes a base plate positioned against the sheet metal component, a hollow cylindrical portion extending from the base plate for engagement with the extended attachment portion protruding from each respective end, and a plurality of stabilizer ribs extending between the base plate and the cylindrical portion for providing strength to the pull handle assembly.

9. The pull handle assembly of claim 8, wherein said stabilizer ribs of each stabilizer plug extend from the base plate of each stabilizer plug to a position spaced from a distal end of the cylindrical portion of each stabilizer plug and form an engagement surface at said position to facilitate trapping the headliner between the engagement surface and the respective end of the body portion.

10. The pull handle assembly of claim 8, wherein said attachment portions and each said stabilizer include key means for properly orienting the stabilizer ribs for optimum strength.

11. The pull handle assembly of claim 10, wherein said attachment portions and each said stabilizer plugs further comprise snap means for securing each stabilizer plug to the respective attachment portion.

12. The pull handle assembly of claim 8, wherein said first and second ends each comprises a snapfitting cover connected to the respective end by a living hinge to facilitate access for screw attachment to the sheet metal component.

13. The pull handle assembly of claim 7, wherein each said extended attachment portion is hollow for receiving an attachment screw.

14. An automotive interior pull handle assembly for attachment to a vehicle sheet metal component which is covered by head impact foam and a headliner, the pull handle assembly comprising:

a body portion forming a grip and having first and second ends;

extended attachment portions protruding from said first and second ends for extending through the head impact foam for attachment to the sheet metal component; and stabilizer plugs over each attachment portion, each plug including a base plate for positioning against the sheet metal component, a hollow cylindrical portion extending from the base plate for engagement with each attachment portion, and a plurality of stabilizer ribs extending between the base plate and the cylindrical portion for providing strength to the pull handle assembly;

wherein said plurality of stabilizer ribs of each plug extend from the base plate of each plug to a position spaced from a distal end of the cylindrical portion of each plug and form an engagement surface at said position to facilitate trapping the headliner between the engagement surface and the respective one of the first and second ends of the body portion.

* * * * *